(12) United States Patent
Salazar Corcuera (10) Patent No.: US 8,197,176 B2
(45) Date of Patent: Jun. 12, 2012

(54) FOLDABLE ACCESS RAMP FOR VEHICLES

(76) Inventor: Javier Salazar Corcuera, Agoncillo-Logroño (ES)

( * ) Notice: Subject to any disclaimer, the term of this patent is extended or adjusted under 35 U.S.C. 154(b) by 856 days.

(21) Appl. No.: 10/581,312

(22) PCT Filed: Oct. 22, 2004

(86) PCT No.: PCT/ES2004/000464
§ 371 (c)(1),
(2), (4) Date: Apr. 24, 2007

(87) PCT Pub. No.: WO2005/039951
PCT Pub. Date: May 6, 2005

(65) Prior Publication Data
US 2007/0183879 A1 Aug. 9, 2007

(30) Foreign Application Priority Data
Oct. 23, 2003 (ES) .................................. 200302475

(51) Int. Cl.
*B65F 1/00* (2006.01)
(52) U.S. Cl. ..................... 414/537; 414/921; 414/500

(58) Field of Classification Search ............... 414/500, 414/921, 537
See application file for complete search history.

(56) References Cited

U.S. PATENT DOCUMENTS 3,651,965 A * 3/1972 Simonelli et al. ............. 414/540
4,966,516 A * 10/1990 Vartanian ..................... 414/537
7,419,349 B2 * 9/2008 Goodrich ..................... 414/546

* cited by examiner

*Primary Examiner* — Saul Rodriguez
*Assistant Examiner* — Willie Berry, Jr.
(74) *Attorney, Agent, or Firm* — Connolly Bove Lodge & Hutz LLP (57) ABSTRACT

This invention relates to a folding ramp for vehicle access, made up of two frames. (5 and 6), linked to one another by a hinge (7) and with the door frame through a hinge (8), which frames can shift between a folded position, folded upon the door, and a deployed position, each frame being made up of two longitudinal beams (15 and 16) and an intermediate floor formed by a moving section (17) and at least one fixed section (18), the moving section (17) being able to shift between a position superimposed with the fixed section (18) and another extracted position, in which it is extended with the fixed portion (18).

8 Claims, 9 Drawing Sheets

FOLDABLE ACCESS RAMP FOR VEHICLES

The present invention refers to a folding ramp for vehicle access, especially applicable to passenger transport vehicles for its use, if necessary, as an evacuation ramp; although it may also be used for loading and unloading merchandise.

More specifically, the ramp of the invention is intended for being assembled on the inside of a door, in the access opening thereof, and is of the type made up of two rectangular frames, articulated with one another through one of their shorter sides, and to the lower part of the door opening through the free shorter side of one of the frames, both frames being able to swing between a folded position, in which they remain against one another and the door opening frame, and a deployed position, in which they are aligned, extended outwards, in order to define a passable path, each frame being made up of two longitudinal beams and an intermediate floor, and both frames being linked to the door frame by means of a suspension cable connected to a collecting drum with a brake assembled on said frame.

An evacuation ramp of the type set forth is known from Spanish patent numbers 9600259 and 9600549 of the same applicants, in which each of the frames forming the ramp is made up of two parallel longitudinal beams based on superimposed double C profiles. The upper C of both longitudinal beams are opposite one another and assembled between them with sliding capability are crosspieces between which a textile sheet is fixed defining the floor of the walkway when the ramp is deployed, whereas when the ramp is folded the crosspieces turn and slide along the longitudinal beams, remaining against each other in the upper portion of the frames, with the sheet folded such that on the two frames that are against one another there are coinciding translucent areas, free from crosspieces and from the sheet, areas which in coincidence with the door may define an opening for visibility or access. Crosspiece movement is controlled by means of cables running through the second C of the longitudinal beams.

This system requires arranging independent cables for folding and deployment of the ramp and for shifting the longitudinal beams, which complicates the walkway makeup. Furthermore, the floor of said walkway in its deployed position may suffer from a lack of rigidity and safety for users.

The present invention has as an object to eliminate the drawbacks set forth by means of a walkway with a simpler and more robust makeup, reducing the number of components for the walkway floor and at the same time strengthening said floor.

According to the present invention, the intermediate floor of each frame includes a moving section, close to the hinge pin of the frames and at least one fixed section. The moving section is limited by the longitudinal beams and can be shifted along these between two end positions, a withdrawn position, in which the moving section is superimposed to the fixed portion of the floor, and another extracted position, in which it remains in extension of said fixed portion in order to complete the floor surface.

Both the moving section of the floor of the two frames and the longitudinal beams of said frames have means for guiding the shifting of the moving sections of the floor. The moving section of the two frames is connected to the frame suspension cables through points adjacent to the nearest edge of the frame hinge pin. With this makeup, the moving sections for the two walkway sections hang from the suspension cables when the frames are in their folded position, shifting due to their own weight towards the extracted position, by progressively releasing the frame suspension cable during said plate deployment operation, whereas the moving section of the two frames shifts towards the withdrawn position when pulling at the cables during the walkway folding operation.

The walkway of the invention further has means for controlling the deployment of the frames and for locking them in their folded position, the locking means being releasable when the closing door reaches a position close to that of maximum opening.

All the features of the invention, as set forth in the claims, are described in more detail below with the aid of the attached drawings, in which a non-limiting embodiment is shown.

Figure 1:
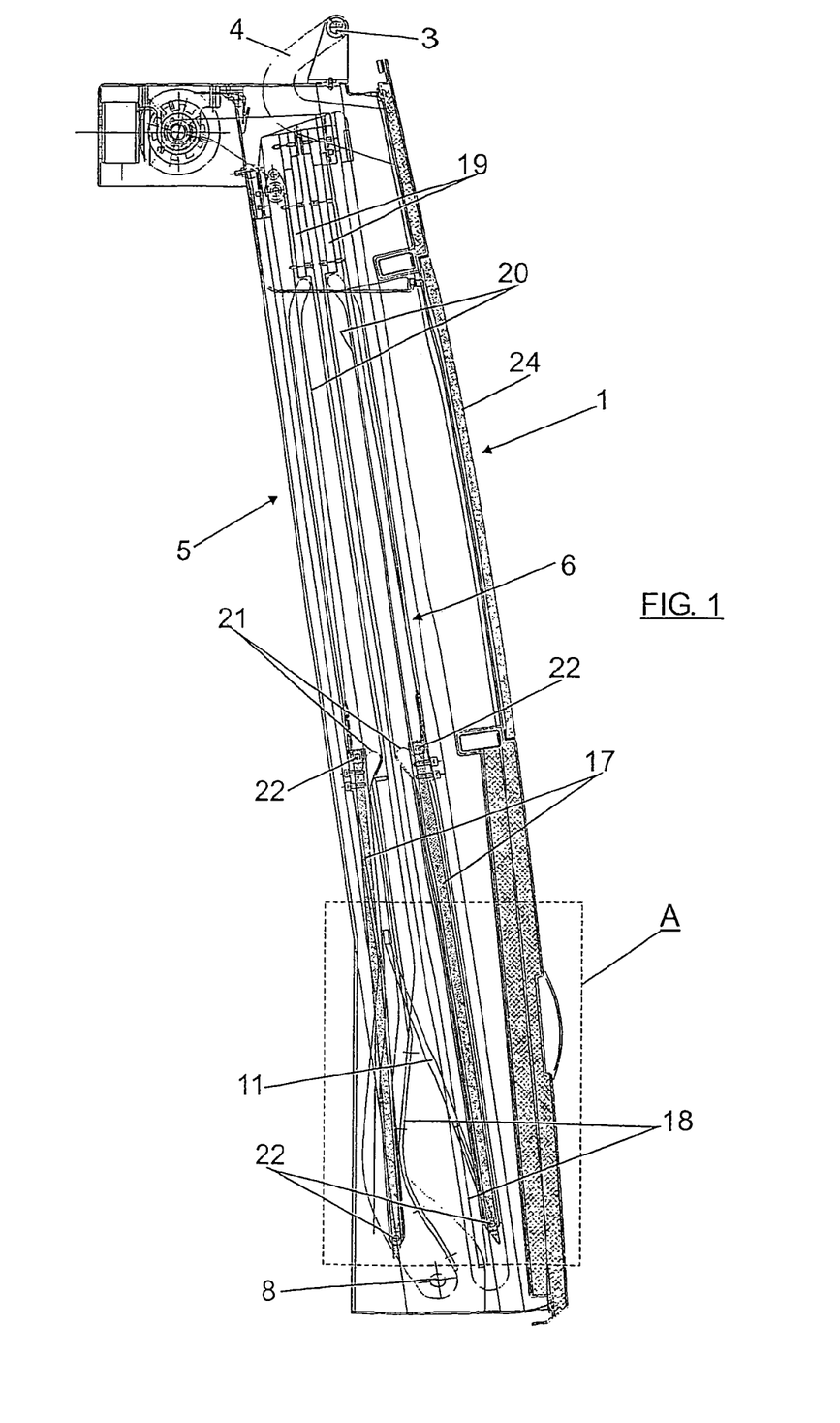
FIG. 1 shows a vertical section of the ramp of the invention, in its folded position and with the door closed.
Figure 2:
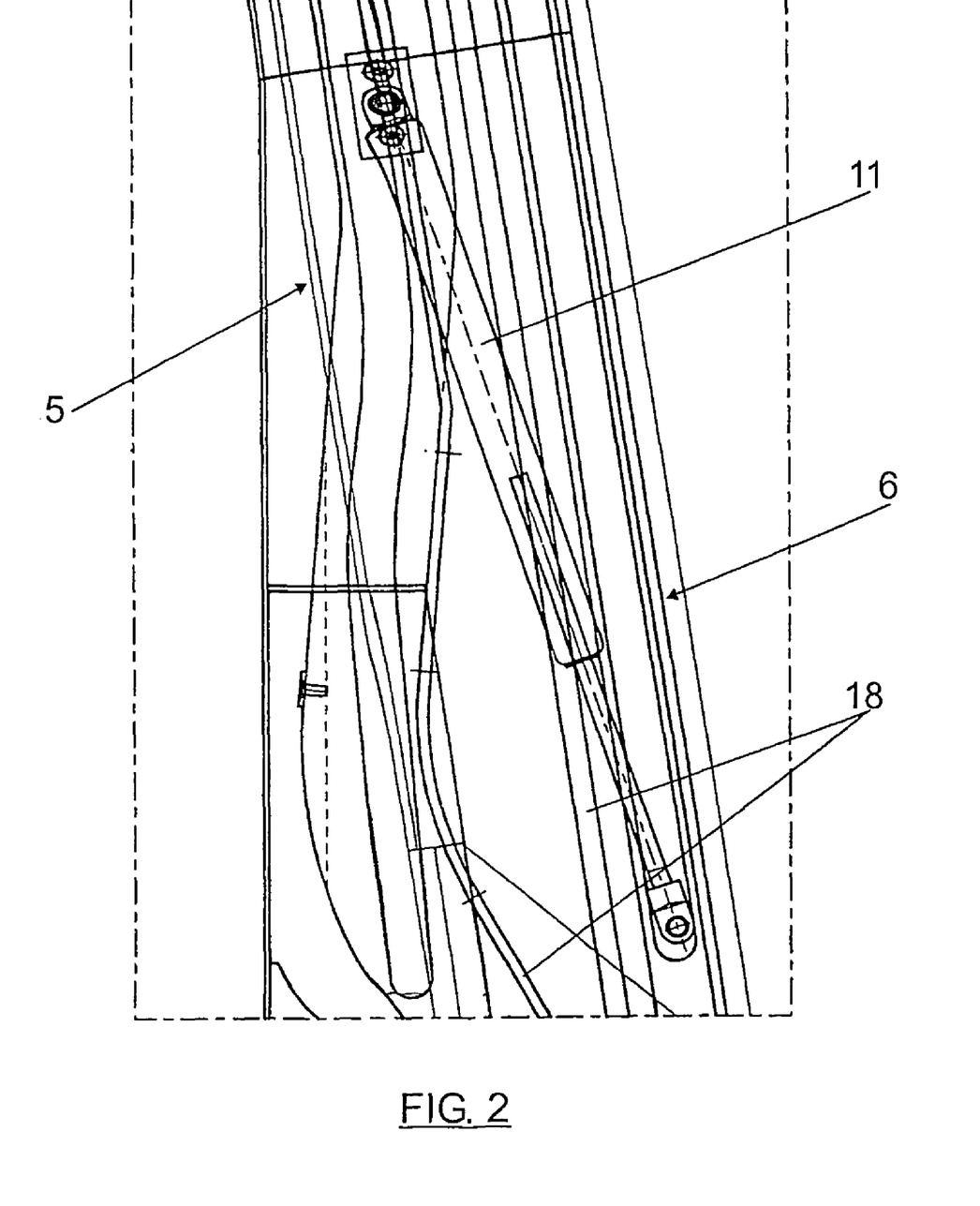
FIG. 2 shows detail A of FIG. 1, at a larger scale.
Figure 3:
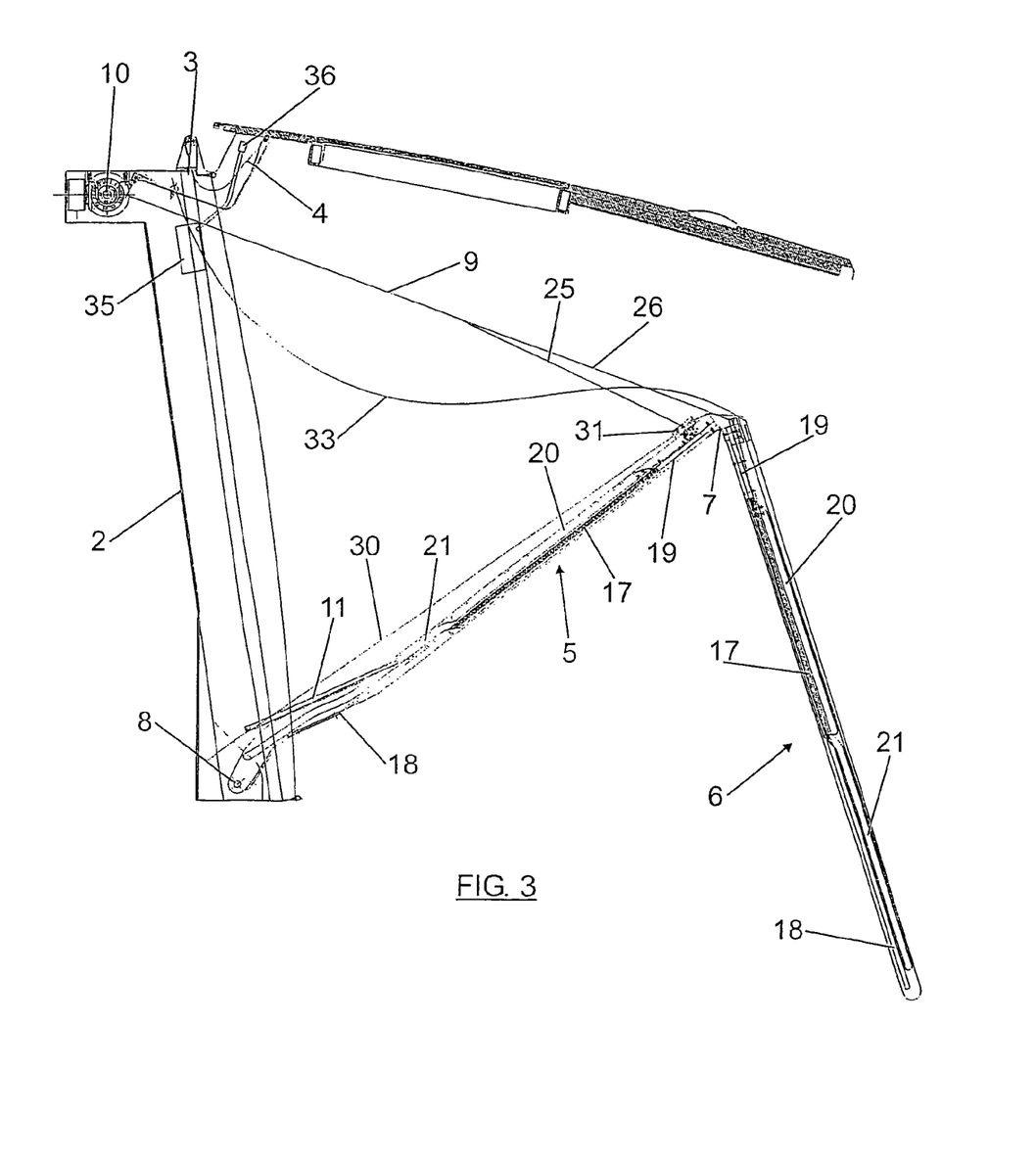
FIG. 3 shows a section similar to FIG. 1, with the door open and the ramp in an intermediate deployment position.
Figure 4:
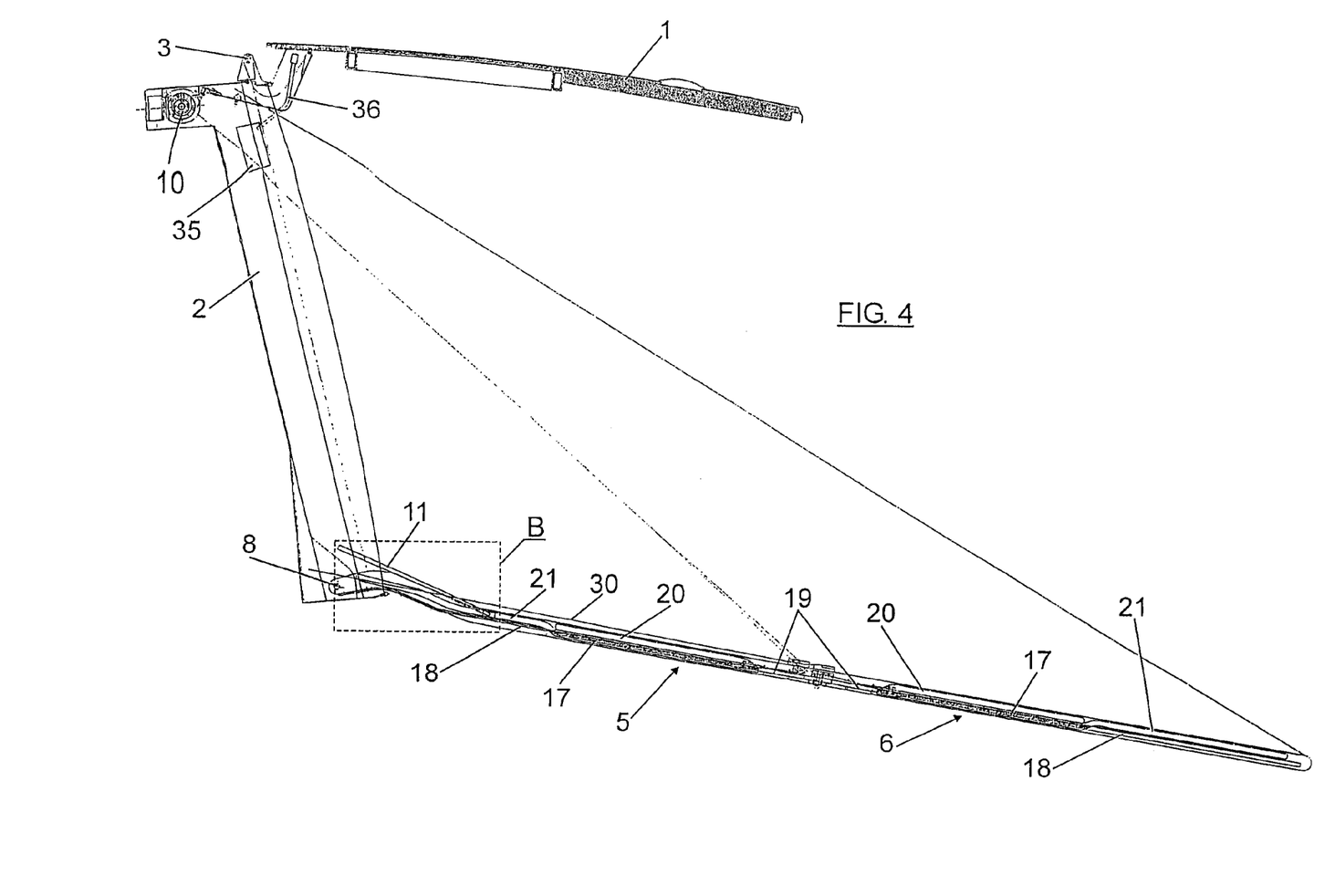
FIG. 4 shows a cross-section similar to FIGS. 1 and 3, with the door open and the ramp completely deployed.
Figure 5:
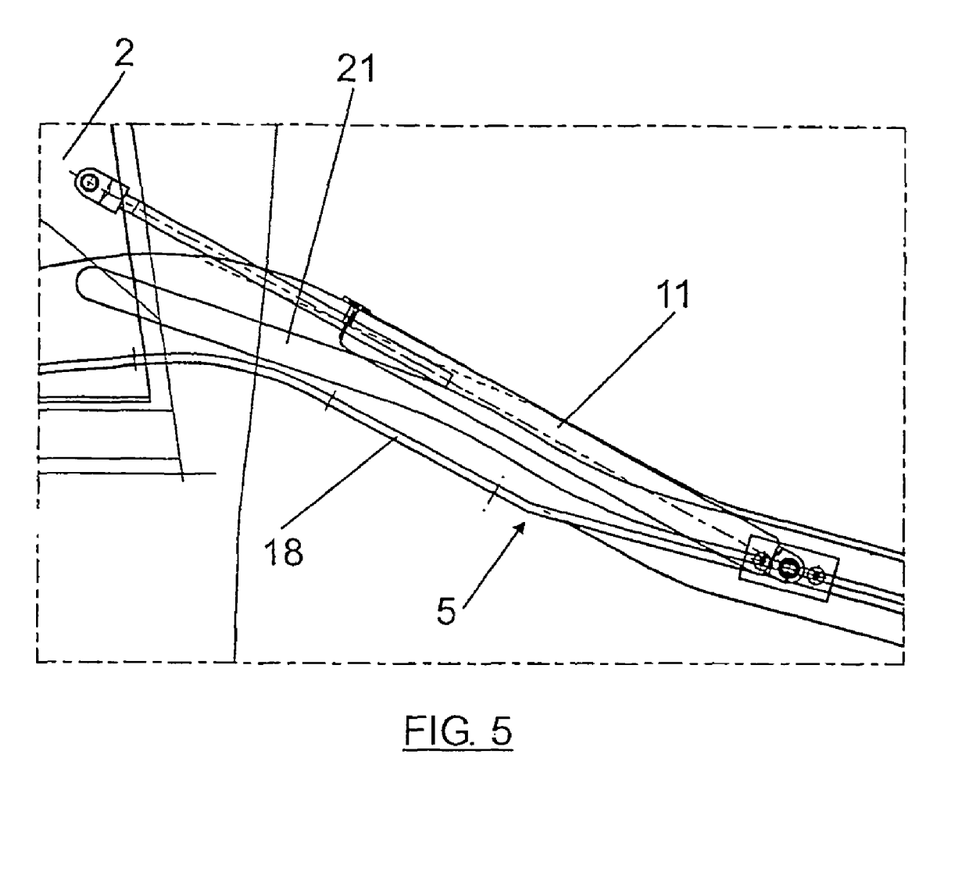
FIG. 5 shows detail B of FIG. 4, at a larger scale.

As can be seen in FIGS. 1 to 7, the ramp of the invention is intended to be assembled in the opening of a door 1 which is assembled on a frame of which one of the vertical pillars is shown in FIGS. 1, 3 and 4, one of the vertical pillars having number 2 as a reference, the door 1 being hinged between the two vertical pillars according to the rotating shaft 3 by means of bent arms 4.

Assembled behind the door 1 between the vertical pillars 2 is the evacuation ramp, which is made up of two frames with reference numbers 5 and 6, linked to one another through one of the shorter edges by means of a hinge 7, the frame 5 being further assembled between the pillars 2 by means of a hinge pin 8 parallel to the hinge pin 7 of the two frames and to the hinge pin 3 of the door 1.

The frames 5 and 6 may swing between a folded position shown in FIG. 1, in which both frames are held together and placed between the pillars 2 of the frame of the door 1, and a deployed position, shown in FIG. 4, in which the frames 5 and 6 are extended in order to define a passage surface.

The frames 5 and 6 are connected, by means of suspension cables 9, to a brake 10 with end drums for collecting the cables 9. From the folded position of FIG. 1, initially by the section of traction dampeners 11, and then the deployment of the ramp occurs once the door 1 is open due to the very weight of the frames 5 and 6, as the brake 10 progressively releases the cable 9, until reaching the position of FIG. 4. Folding of the frames is achieved by means of pulling the cable 9 due to the action of the braking mechanism 10. In order to control the deployment operation, the frame 5 is linked to the pillars 2 of the frame of the door 1 by means of pneumatic or hydraulic springs 11 which are shown more clearly in FIGS. 2 and 5.

Figure 6:
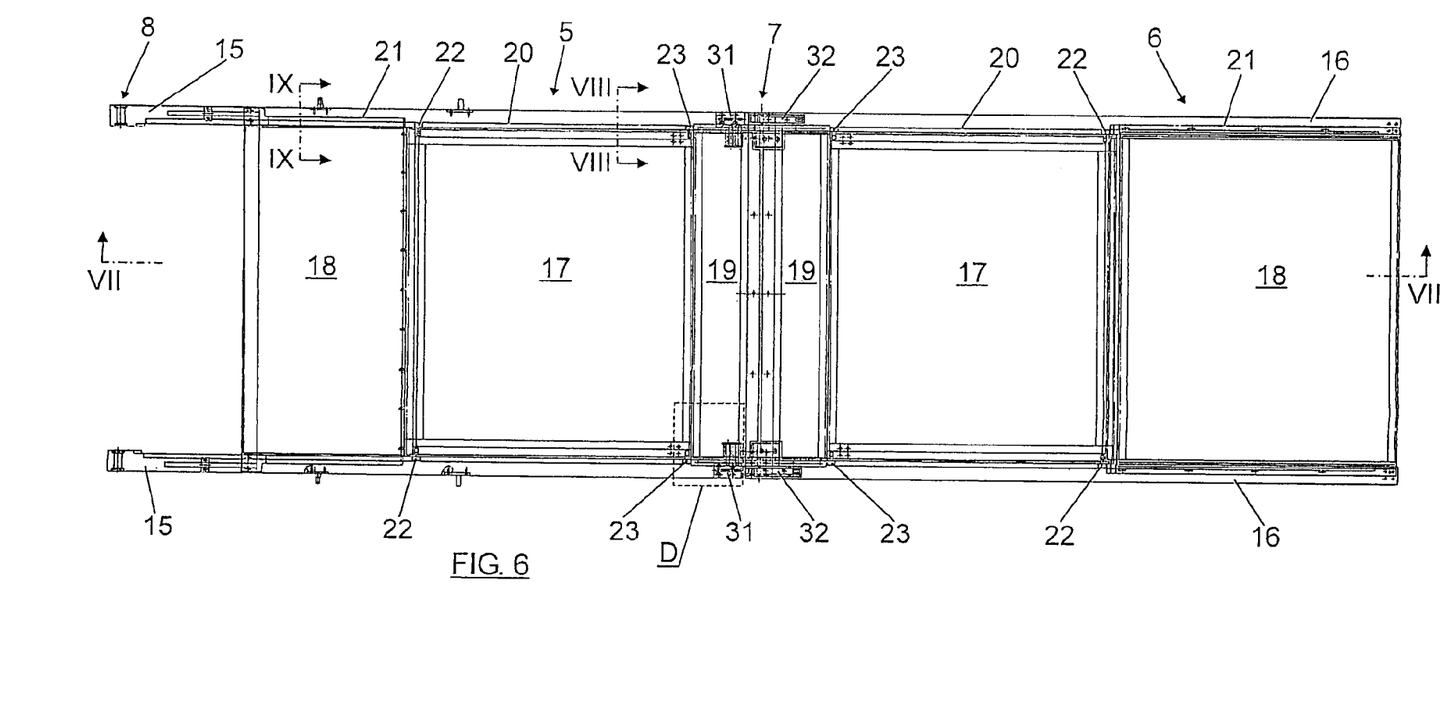
FIG. 6 shows a plan view of the walkway in its deployed position.
Figure 7:
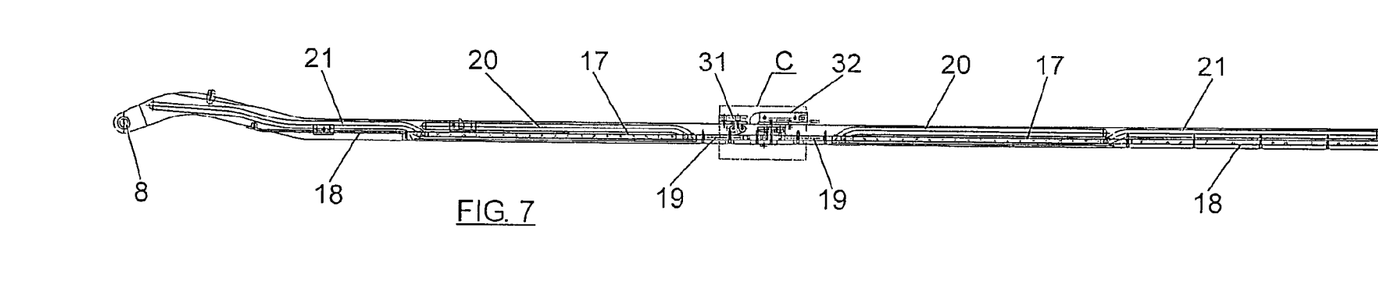
FIG. 7 shows a longitudinal section of the deployed walkway along section line VII-VII of FIG. 6.
Figure 8:
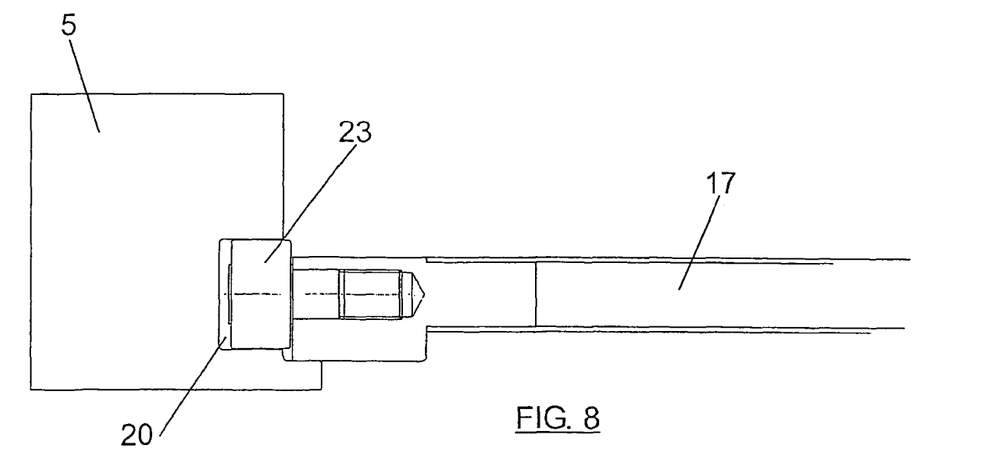
FIG. 8 shows a partial cross-section of the walkway, taken along section line VIII-VIII of FIG. 6, showing the moving section of the floor in its extended position.

As can be best observed in FIGS. 6 to 8, each one of the frames 5 and 6 is made up of two longitudinal beams 15 and 16, between which an intermediate floor is arranged including a moving section 17 and two fixed sections 18 and 19, these fixed sections 18 and 19 being usable as connection elements for longitudinal beams 15 and 16.

Figure 9:
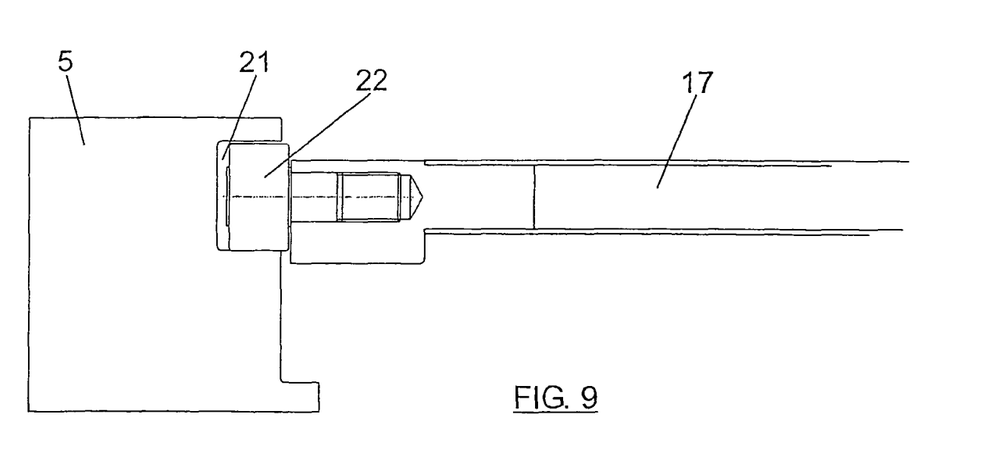
FIG. 9 shows a partial cross-section of the walkway, taken along section line IX-IX of FIG. 6, in which the fixed section of the floor has been omitted.

As can be best observed in FIGS. 7 to 9, each one of the longitudinal beams 15 and 16 have on their opposing faces two longitudinal grooves 20 and 21 in which bolts or runners are introduced which project from the longitudinal edges of the moving sections 17, close to their ends and with reference numbers 22 and 23, the bolt or runner 22 being introduced in groove 21, whereas the bolt or runner 23 is introduced in groove 20, both bolts or runners being able to shift along the grooves 20 and 21, such that the section 17 of the floor can shift between the position shown in FIG. 6, in which it is extended and in a coplanar position with sections 18 and 19, and a folded position, in which the moving section 17 remains placed on the fixed section 18.

When the walkway is in the position of FIG. 1, the moving sections 17 are placed on the fixed sections 18 and as the two frames 5 and 6 are placed against the free openings of these sections 17 they are opposite one another and with a possible transparent window 24 of the door 1, as can be seen in FIG. 1.

When deploying the walkway until it reaches its completely extended position, as seen in FIGS. 3 and 4, the moving panels 17 shift progressively towards the hinge pin 7 of the two frames, until they are located between the fixed panels 18 and 19, thus completing the passage surface, all this with the moving section 17 being guided through the grooves 20 and 21 by means of the bolts or runners 22 and 23. When the walkway is folded the process is the reverse, and the moving sections 17, due to their own weight, descend progressively until reaching the position of FIG. 1.

Figure 10:
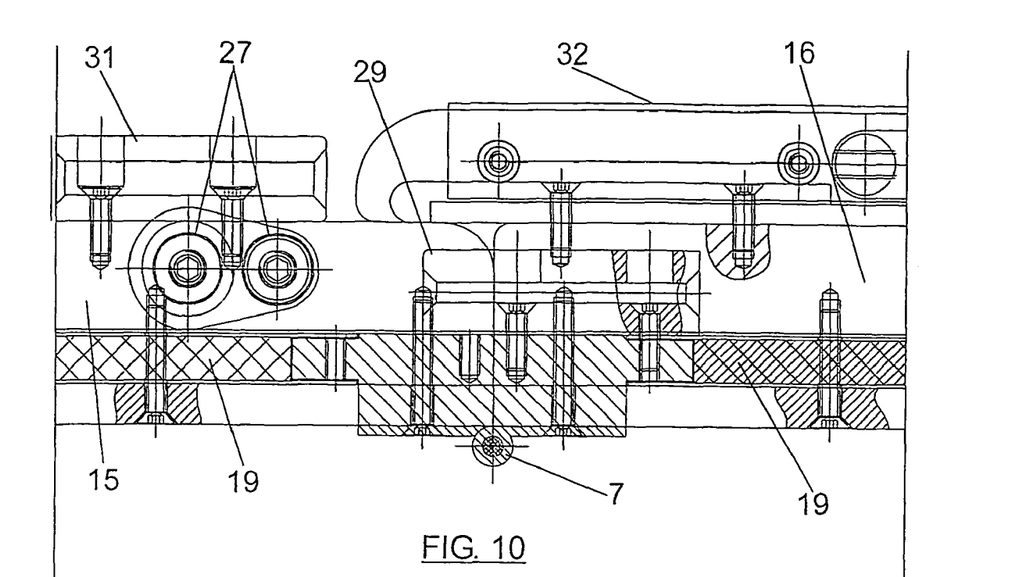
FIG. 10 shows detail C of FIG. 7, at a larger scale.

The shifting of the moving sections 17 of the floor of the walkway is achieved through the suspension cables 9 of the frames. In order to do this the cable 9 is branched into two sections 25 and 26 through a branching part, not shown, which acts as a compensating and/or regulating element in order to achieve the same tension in the two sections, as can be better observed in FIG. 3, of which sections section 25 is passed through guiding rollers 27 assembled on the longitudinal beams 15, FIGS. 9 and 10, in order to be later fixed to the moving section 17 of frame 5 at points 28 close to the edge adjacent to the hinge pin 7 of the frames. For its part, section 26 of the suspension cables 9 is passed through guides 29, FIG. 9, assembled on the longitudinal beams 16 of frame 6, in order to fix them later to the moving section 17 of frame 6 at points close to the edge adjacent to the fixed section 19. With this arrangement it is achieved that when pulling or letting out the cable 9, the moving section 17 of the two frames 5 and 6 rises or falls at the same speed.

As can be observed in FIG. 3 the walkway is further linked to the two pillars 2 of the door opening by means of a pair of cables 30 which are introduced through cable protectors 31 integral with the longitudinal beams 15 of frame 5 and anchored to supports 32 integral with the longitudinal beams 16 of frame 6, as shown in greater detail in FIG. 9. Anchored to this support 32 there is a cable 33 which is connected to the upper end of the pillars 2 of the door opening, as can be observed in FIG. 3, the cables 30 and 33 serving as auxiliary folding and suspending means to assure the position of FIG. 4 even in the case that the free end of the walkway does not rest on the ground or a fixed support point.

In short, the makeup described provides a walkway with a rigid floor including section 17 which in the folded position leave free spaces coinciding with the window of the door, in order to have an open vision area, obtaining the shifting of these sections in an automatic manner when deploying the walkway as the brake 10 lets out the suspension cable 9.

As can be seen in FIGS. 3 and 7 the longitudinal grooves 20 and 21 which guide the shifting of the moving section 17 of the floor of the frames have a path facilitating the shifting of said sections and guides them in order to place them in a superimposed position of the fixed sections 18 when the walkway is folded, and in a coplanar position with the fixed sections 18 and 19 when the walkway is extended.

Figure 12:
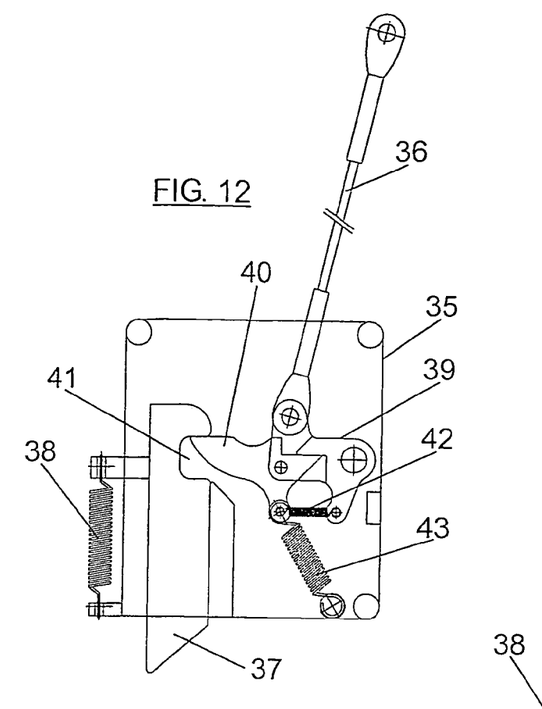
FIGS. 12 to 14 show a frame locking mechanism, in its folded position of FIG. 1.

The folded and withdrawn position of the walkway is secured by means of a locking mechanism 35, FIGS. 3 and 4, that can be actuated from the door 1 by means of a lever 36 hinged to the hinging arm 4 of the door 1. The locking device 35 comprises a box casing housing a latch 37 vertically shifting between an extracted position, shown in FIG. 1, in which the portion projecting from the box 35 acts as a stop preventing the exit of the walkway, and a retracted position shown in FIG. 12, in which the latch 37 remains inside the box 35, thus allowing the exit of the walkway.

Figure 11:
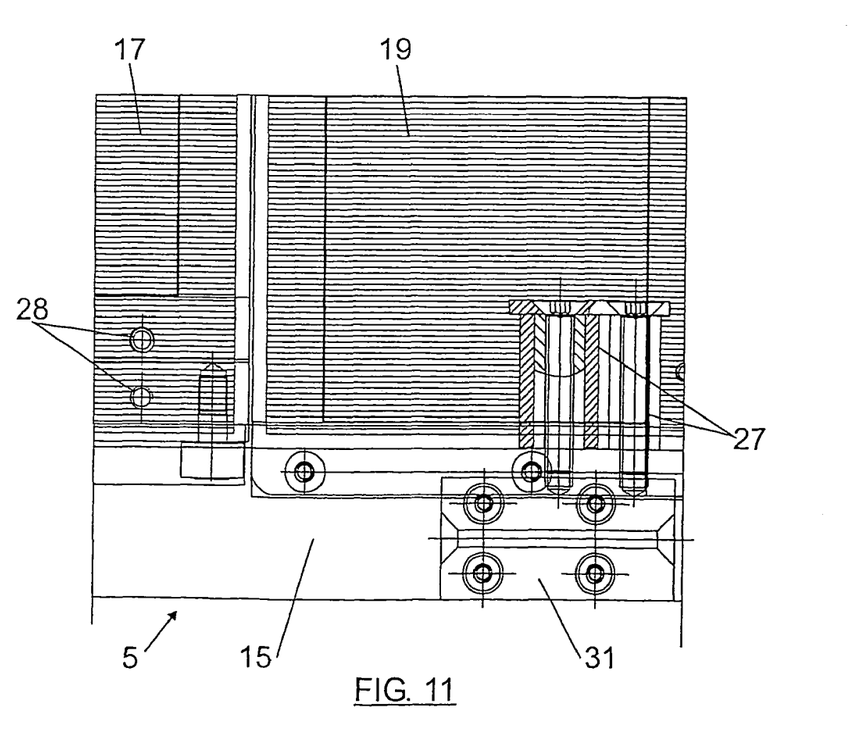
FIG. 11 shows detail D of FIG. 6.
Figure 13:
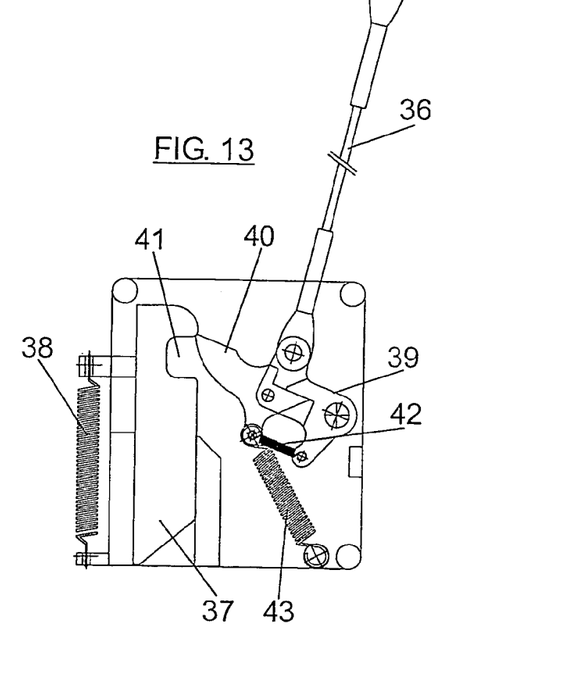
Figure 14:
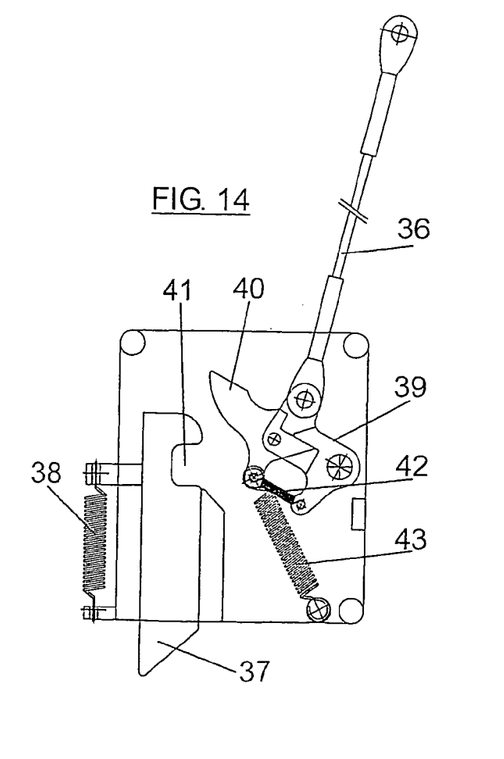

The latch 37 is constantly pushed towards the extracted position of FIGS. 11 and 13 by means of a spring 38 and its shifting is carried out by means of a lever 39 connected to the door 1 by means of the arm or cable 36 and has a push rod 40 hinged to it which is capable of acting on the notch 41 of the latch 37.

When the door 1 is closed, the lever 39 and push-rod 40 are in the position of FIG. 11 and the latch 37 is in its extracted position in order to prevent the exit of the ramp. When opening the door 1, as it is being lifted, the cable 36 pulls the lever 39, causing the push-rod 40 to swing, which pulls the latch 37 upwards until reaching the position of FIG. 12, when the door 1 is close to its maximum opening position. After this moment, when the door 1 is completely open in the position of FIG. 4, the push-rod 40 overcomes the notch 41 of the latch 37 which, due to the action of the spring 38, recovers its maximum extraction position, as shown in FIG. 13. When closing the door, the push-rod 40 will slide on the upper rounded end of the latch 37, giving way due to the effect of the springs 42 and 43 until occupying again the position of FIG. 11, when the door is completely closed and the ramp is folded and withdrawn, in order to act as a stop preventing accidental extraction of said ramp.

The outer frame 6 of the ramp may have a step hinged on its free end.

The brake 10 controlling the suspension cable 9 of the walkway will include two end drums for winding the two cables 9 and a braking mechanism assuring a smooth and controlled deployment of the walkway.

The invention claimed is:

1. A folding ramp for vehicle access, the ramp comprising:
a first and a second rectangular frame, the two frames being affixed to each other by a first hinge and one of the two rectangular frames being affixed to a door frame of the vehicle by a second hinge, wherein the rectangular frames pivot between a folded position within the door frame and a deployed position, wherein each of the first and second rectangular frames include:
a first fixed floor section disposed distal from the first hinge; and
a moving floor section movable between an extracted position, in which the first fixed floor section and the moving floor section are adjacently disposed such that both form a ramp floor surface, and a withdrawn position overlying the first fixed floor section and distal from the first hinge, wherein the moving floor section shifts into the withdrawn position due to gravity when the rectangular frames are moved into the folded position;
a cable brake affixed to the door frame;

a suspension cable operatively extending from the cable brake to affix to each of the moving floor sections, wherein the suspension cable passes through first and second guides in the first and second rectangular frames, respectively, near the first hinge, and wherein the suspension cable is configured to draw the moving floor section of each rectangular frame into the extracted position when the rectangular frames are moved into the deployed position;

a locking mechanism affixed to the door frame and configured to secure the rectangular frames in the folded position; and means for controlling deployment of the rectangular frames.

2. The folding ramp of claim 1, wherein each of the first and second rectangular frames further includes guides in longitudinal edge beams, and the moving floor section of each rectangular frame includes runners positioned to interact with the guides to enable the moving floor section to move between the extracted position and the withdrawn position.

3. The folding ramp of claim 2, wherein each guide comprises a longitudinal groove disposed in the respective longitudinal edge beam, each groove including at least one transverse displacement section which interacts with the respective runner to place the moving floor section coplanar with the first fixed floor section when the moving floor section is in the extracted position.

4. The folding ramp of claim 1, wherein each of the first and second rectangular frames further include a second fixed floor section disposed adjacent to the first hinge, and when in the extracted position, the moving floor section is disposed between and coplanar with the first and second fixed floor sections.

5. The folding ramp of claim 1, wherein the means for controlling deployment of the rectangular frames comprises a pneumatic or hydraulic spring with adjustable tension affixed between the door frame and one of the first and second rectangular frames.

6. The folding ramp of claim 1, wherein the locking mechanism is configured to release the rectangular frames from the folded position when a door of the vehicle nears a maximum open position.

7. The folding ramp of claim 6, the locking mechanism comprising:

a latch biased toward a locked position which secures the rectangular frames in the folded position;

a push-rod and a lever configured to actuate the latch and release the rectangular frames from the folded position, wherein the push-rod and lever are biased against actuating the latch; and a cable connecting the lever to the door of the vehicle, wherein when the door nears the maximum open position, the door actuates the push-rod and the lever to actuate the latch.

8. The folding ramp of claim 1, wherein each of the first and second guides comprises guide rollers.

* * * * *